United States Patent
Gupta et al.

(10) Patent No.: US 7,779,065 B2
(45) Date of Patent: Aug. 17, 2010

(54) DYNAMIC COST NETWORK ROUTING

(76) Inventors: Sanyogita Gupta, 8 Colasurdo Ct.,
Edison, NJ (US) 08820; Srividya Iyer,
23 Aberdeen Cir., Flemington, NJ (US)
08822; Chad Herbert, 49 Millburn Dr.,
Hillsborough, NJ (US) 08844; **David
Dudley**, 19 Barry Rd., Plymouth, CT
(US) 06782

( * ) Notice: Subject to any disclaimer, the term of this
patent is extended or adjusted under 35
U.S.C. 154(b) by 1430 days.

(21) Appl. No.: 10/665,033

(22) Filed: Sep. 18, 2003

(65) Prior Publication Data
US 2005/0066052 A1    Mar. 24, 2005

(51) Int. Cl.
*G06F 7/00* (2006.01)
(52) U.S. Cl. ............... 709/202; 709/238; 709/239; 709/240; 709/241
(58) Field of Classification Search ............ 709/200, 709/202, 238, 239, 20, 241
See application file for complete search history.

(56) References Cited

U.S. PATENT DOCUMENTS

| | | | |
|---|---|---|---|
| 5,754,543 A * | 5/1998 | Seid | 370/351 |
| 6,078,946 A * | 6/2000 | Johnson | 709/200 |
| 6,144,641 A | 11/2000 | Kaplan et al. | |
| 6,289,096 B1 * | 9/2001 | Suzuki | 379/221.01 |
| 6,363,319 B1 * | 3/2002 | Hsu | 701/202 |
| 6,377,551 B1 * | 4/2002 | Luo et al. | 370/238 |
| 6,490,287 B1 * | 12/2002 | Kilkki | 370/395.42 |
| 6,829,347 B1 * | 12/2004 | Odiaka | 379/220.01 |
| 6,956,821 B2 * | 10/2005 | Szviatovszki et al. | 370/237 |
| 6,961,310 B2 * | 11/2005 | Cain | 370/238 |
| 6,981,055 B1 * | 12/2005 | Ahuja et al. | 709/238 |
| 7,020,087 B2 * | 3/2006 | Steinberg et al. | 370/238 |
| 7,099,277 B2 * | 8/2006 | Sahinoglu et al. | 370/238 |
| 7,187,652 B2 * | 3/2007 | Lee et al. | 370/238 |
| 2004/0044466 A1 | 3/2004 | Nesbitt | |
| 2005/0083936 A1 | 4/2005 | Ma | |

OTHER PUBLICATIONS

International Search Report and Written Opinion for PCT/US04/29824, mailed Jul. 20, 2006.
Supplementary European Search Report for EP 04 78 3877, completed Dec. 11, 2008.
Communication from the European Patent Office for EP 04 783 877.6, dated Jan. 27, 2010.
Office Action for Canadian Patent Application 2,538,249, dated Feb. 24, 2010.

* cited by examiner

*Primary Examiner*—Kevin Bates
*Assistant Examiner*—Van Kim T Nguyen

(57) ABSTRACT

To determine a network route corresponding to user needs, costs are dynamically defined for each link of a network. Specifically, based on link characteristics, routing factors are defined and for each factor, allowable values are defined. When determining a route, one or more routing factors and one or more allowable values for each factor are selected. Based on user prioritization of these factors and prioritization of the allowable values for each factor, weights are assigned to the factors and costs are assigned to the values. Link costs are determined by comparing a given link to each selected factor and determining for each factor which allowable value matches the link's characteristics. The cost of each matching value is then weighted by its corresponding factor. The weighted costs are summed to determine a link cost. The link costs are subsequently used to determine a route through the network.

16 Claims, 3 Drawing Sheets

DYNAMIC COST NETWORK ROUTING

FIELD OF THE INVENTION

Our invention relates generally to automatic routing through a communications or data network given a graph of links and nodes. More particularly, our invention relates to the dynamic costing of links in accordance with user-defined preferences and routing based on these costs.

DESCRIPTION OF THE BACKGROUND

Prior to provisioning a circuit through a network (e.g., telecommunications network, data network, etc.) for a given service, a route must be determined between the desired start and end points. To determine this route, the network is typically modeled as a graph of links and nodes where each link is assigned a cost. Based on the costs, a least cost/shortest path routing algorithm, such as Dijkstra's algorithm, is used to dynamically find a shortest/least cost route between two of the end-points specified by a user. The new circuit is then provisioned over this determined route for the service.

To determine the link costs, an administrator of the network analyzes the different technologies and characteristics of the network links and makes a pre-determination as to the importance of each characteristic, giving some greater importance than others. Based on this analysis, the administrator assigns each link a cost giving links with more desirable characteristics (such as higher bandwidth) a lower cost. Accordingly, such links are usually selected when executing a routing algorithm.

A significant downside to this method of costing links is that the costs are static and, once defined/assigned to a link by an administrator, cannot be changed between users or between route determinations. Consequently, each user of the network is subject to these costs or, in other words, is subject to the importance the network administrator assigned to the varying characteristics of the network. However, not all services users wish to provision are the same. Accordingly, if given a choice, a user would typically assign different importance to the varying network characteristics (and thereby different link costs) depending on the service to be provisioned. As a result, the best route for a given service is typically not obtained. To get around this problem, a user needs to acquire detailed knowledge of the network to more particularly specify a desired route that meets the needs of the desired service.

SUMMARY OF OUR INVENTION

Accordingly, it is desirable to provide methods that overcome the shortcomings of the prior art and that determine a route through a network using link-costs that are based on dynamically defined, user specified preferences and priorities. By dynamically determining link costs based on each user's particular needs, network routes that more closely correspond to the services to be provisioned are obtained. In accordance with our invention, a network administrator defines a set of "routing selection factors" for the network and defines for each factor a set of allowable values. The routing selection factors and allowable values are based on the characteristics of the links that comprise the network. As part of the process for determining a network route for a new circuit, a user uses the routing selection factors to dynamically define and assign costs to the network links such that the costs reflect those link characteristics that are important to the user with respect to the type of service the user needs to provision. These dynamically determined link costs are used to determine a network route.

Specifically, in accordance with a first embodiment of our invention, a user first specifies to a network routing system one or more of the routing selection factors that are important to the user with respect to provisioning a new circuit. Similarly, for each selected routing selection factor, the user specifies one or more allowable values, referred to as preference values, that are important to the user. The user then prioritizes the selected routing selection factors and, for each factor, prioritizes the preference values. Based on the priorities of the selected routing selection factors, a weight is assigned to each factor (either by the user or automatically by a network routing system), the weights being referred to as "weighting for priority values." Similarly, for each routing selection factor, the preference values are assigned "preference factor costs" based on the priorities.

Once the "weighting factor for priority values" and preference factor costs are determined, the network routing system dynamically determines a cost for each link in the network by comparing each link to the selected routing selection factors and preference values and then uses the determined costs to find a least cost route. Specifically, the network routing system compares each link to each routing selection factor and for each factor determines which preference value matches the characteristics of the link and chooses the corresponding preference factor cost. Each selected preference factor cost is then weighted by the "weighting factor for priority value" of its corresponding routing selection factor to produce a weighted cost. The weighted costs for a given link are then summed to produce a final cost for the link. Once the network routing system dynamically determines a cost for each network link, the system uses an algorithm, such as Dijkstra's algorithm, to determine all possible routes and then chooses from among these routes a least cost route for the new circuit.

In accordance with a second embodiment of our invention, the method proceeds as described with respect to determining the "weighting factor for priority values" and preference factor costs." However, rather than the network routing system assigning a cost to each network link and then determining a route, these steps are combined. Specifically, once having the "weighting factor for priority values" and "preference factor costs," the network routing system determines a cost for each link as it determines a route between the start and end nodes as specified by the user. This second embodiment has the advantage that a link cost is not calculated unless the algorithm considers the link as a possible route.

DETAILED DESCRIPTION OF OUR INVENTION

Figure 1:
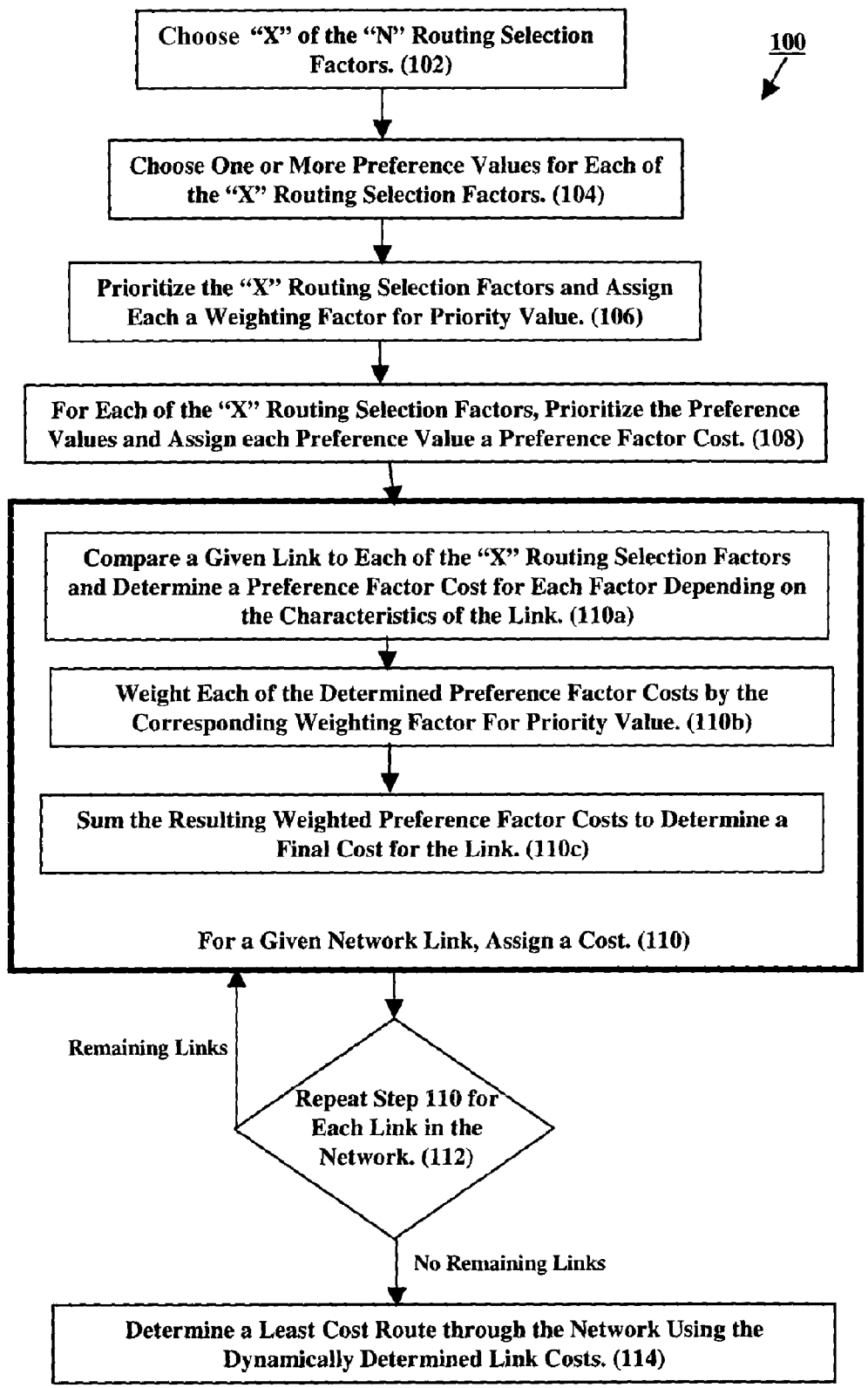
FIG. 1 depicts a flow chart for an illustrative first embodiment of our method for determining a route through a network using dynamically defined link-costs based on user-defined preferences.

Our invention is a method for determining a route through a network using link-costs that are dynamically defined based on user-defined preferences. By allowing each user to define a set of preferences and priorities for the links of a network, each user is able to stress which network characteristics are important to that user and thereby customize a network route that best meets the needs of the services the user wishes to provision. Specifically, in accordance with our invention, a network administrator defines a set of "routing selection factors" for the network and also defines for each factor a set of "allowable values." The routing selection factors are based on the characteristics of the links that comprise the network and are the types of characteristics users consider when provisioning a circuit. For example, with respect to layer-one network routing, the technology and physical transmission media of a link define one type of network characteristic that is important to a user when selecting a route. Accordingly, a possible routing selection factor is "transport mechanism," which has possible values, for example, including: SONET (Synchronous optical Network), SDH (Synchronous Digital Hierarchy), PDH (Plesiochronous Digital Hierarchy), Async, Fiber, Copper, Coax, etc. Similarly, the protection level of the links is often important to a user when determining a network route. As such, another routing selection factor is "protection level," which has possible values, for example, including: unprotected, fully protected, highly protected, etc. The network administrator enters/programs the routing selection factors and corresponding allowable values into a network routing system, which determines network routes for users and provisions corresponding circuits.

In accordance with our invention, a user chooses from among the defined routing selection factors those factors that are important to the user with respect to provisioning a new circuit. The user also specifies for each selected routing selection factor those allowable values, from among the defined allowable values, that are important to the user with respect to provisioning a new circuit. The chosen allowable values are referred to as "preference values." Lastly, the user prioritizes the chosen routing selection factors amongst each other and prioritizes, for each routing selection factor, the chosen preference values. The intent of our invention is for the network routing system to choose a network route that has characteristics that most closely meet the user's chosen routing selection factors and preference values according to the defined priorities. To achieve this end, the network routing system uses the specified routing selection factors and preference values to automatically determine and assign a cost to each link in the network. The lower the determined cost for a given link the more closely that link matches the user's selected routing selection factors and preference values. Based on the costs assigned to each link, the network routing system uses an algorithm, such as Dijkstra's algorithm, to determine and establish a least cost route for the new circuit.

More specifically, the user defined priorities assigned to each preference value act as costs, referred to as "preference factor costs," and the user defined priorities assigned to each routing selection factor act as weights, referred to as "weighting factor for priority values." Once the user selects a set of routing selection factors, preference values, and priorities, the network routing system can dynamically calculate a cost for each network link by comparing the specific link to each of the chosen routing selection factors and preference values. Hence, the network routing system compares the first link to the first routing selection factor, determines which preference value matches the characteristics of the link, and chooses the corresponding preference factor cost. This preference factor cost is then weighted by the "weighting factor for priority value" of the routing selection factor. The network routing system then repeats this process for the first link using the second of the selected routing selection factors, etc. To arrive at a final cost for the link, the network routing system sums the weighted costs. The same process is repeated for other links in the network.

Equation (1) summarizes how the network routing system determines a cost for a given link. Assuming a user chooses "X" of "N" defined routing selection factors, the combined cost of a link is defined as:

$$\sum_{n=1}^{x} w_n c_n \qquad (1)$$

where $w_n$ is the "weighting factor for priority value" assigned to the $n^{th}$ routing selection factor and $c_n$ is the "preference factor cost" of the preference value corresponding to the link. Advantageously, our inventive routing method allows each user of a network to dynamically define and assign costs to the network links based on that user's particular needs and to thereby obtain a network route that corresponds to the user's needs. Unlike the prior routing methods, a user does not need detailed knowledge of the network in order to achieve a route with desired network characteristics. Reference will now be made in greater detail to our invention.

FIG. 1 is a flow chart of a first embodiment of our inventive method 100 for determining a network route using dynamically defined link-costs based on user preferences, with steps 106-114 being executed by a programmed element of the network routing system. Initially, an administrator defines a set of "N" routing selection factors for a given network. The actual factors are based on the characteristics of the links that comprise the network and are the same for all users of the network. In addition, a set of allowable values is defined for each routing selection factor. Again, the range of allowable values is the same for all users of the network. The specified routing selection factors and the set of allowable values for each factor are not specific to our invention. For discussion purposes, Table 1 shows a set of generic routing selection factors and allowable values for each factor. Table 2 is an example result of applying method 100 to the factors and values of Table 1 (The entries of Table 2 are discussed below).

TABLE 1

Example Set of Routing Selection Factors and Values

| Routing Selection Factor | Possible values |
|---|---|
| Factor-1 | Factor-1: Value-1 |
|  | Factor-1: Value-2 |
|  | Factor-1: Value-3 |
|  | Factor-1: Value-4 |
| Factor-2 | Factor-2: Value-1 |
|  | Factor-2: Value-2 |
|  | Factor-2: Value-3 |

TABLE 1-continued

Example Set of Routing Selection Factors and Values

| Routing Selection Factor | Possible values |
|---|---|
| Factor-3 | Factor-3: Value-1 |
|  | Factor-3: Value-2 |
|  | Factor-3: Value-3 |
| Factor-4 | Factor-4: Value-1 |
|  | Factor-3: Value-2 |
|  | Factor-4: Value-3 |
|  | Factor-4: Value-4 |

TABLE 2

Example Set of Routing Selection Factors and Preference Values

| Selected "Routing Selection Factors" | Priority of Selected "Routing Selection Factors" | "Weighting Factor for Priority Values" | Selected "Preference Values" | Priority of Selected "Preference Values" | "Preference Factor Costs" |
|---|---|---|---|---|---|
| Factor-1 | 2 | 0.333 | Factor-1: Value-1 | 2 | 0.200 |
|  |  |  | Factor-1: Value-2 | 4 | 0.400 |
|  |  |  | Factor-1: Value-3 | 1 | 0.100 |
|  |  |  | Factor-1: Value-4 | 3 | 0.300 |
| Factor-3 | 1 | 0.5 | Factor-3: Value-2 | 1 | 0.333 |
|  |  |  | Factor-3: Value-3 | 2 | 0.666 |
| Factor-4 | 3 | 0.166 | Factor-4: Value-1 | 2 | 0.333 |
|  |  |  | Factor-4: Value-2 | 1 | 0.166 |
|  |  |  | Any | 3 | 0.500 |

Beginning with step 102, a user first specifies which of the "N" routing selection factors the network routing system should consider when determining a cost for each network link (Assume the user selects "X" factors). As shown by exemplary Table 2, column 1, a user may select Factors 1, 3, and 4. The network routing system disregards those factors the user did not specify. In step 104, the user next specifies for each of the selected routing selection factors which of the allowable values should be considered when determining link costs. Again, these values are referred to as the preference values. As shown by Table 2, column 4, the user may select all or a subset of the allowable values for each of the selected routing selection factors. As shown by "Factor-4", the user may also specify a value of "any," which is further described below.

In step 106, the user prioritizes the selected routing selection factors (Table 2, column 2) and based on these priorities, assigns each factor a "weighting factor for priority value" (Table 2, column 3). Importantly, by varying the priority of the selected factors, the user varies the resulting costs of the links and as such, varies the resulting route determined by the network routing system. Preferably, the selected "weighting factor for priority values" should each have a value between zero and one and should preferably add up to one. In other words:

$$0 \le w_n \le 1 \quad (2)$$

$$\sum_{n=1}^{X} w_n = 1 \quad (3)$$

While a user may choose the "weighting factor for priority values" outright, the network routing system may also choose weights based on the user-assigned priorities. One method for determining the weighting values is to assign the highest priority routing selection factor a "weighting factor for priority value" of "A", the next highest priority factor a weight of $((X-1)/X)A$, the next a weight of $((X-2)/X)A$, etc., and the lowest priority factor a weight of $((X-(X-1))/X)A$. Because these "weighting factor for priority values" should sum to one, a value for "A" can be determined and correspondingly, a weight can be assigned to each factor. This method was used to determine the "weighting factor for priority values" shown in Table 2, column 3. Note that the exact method for determining the "weighting factor for priority values" is not specific to our invention.

In step 108, the user prioritizes the selected preference values for each routing selection factor (Table 2, column 5) and based on these priorities, assigns each preference value a "preference factor cost," with the highest priority preference value receiving the lowest cost, etc. Again, by varying the costs of the preference values, the user varies the resulting costs of the links and as such, varies the resulting route determined by the network routing system. Preferably, each selected cost should have a value between zero and one and the costs should add up to one.

Again, a user can select the costs outright or the network routing system may also choose costs based on the user-assigned priorities. One method for determining the "preference factor costs" for each preference value is to use a method similar to above (again, the exact method for determining the "preference factor costs" is not specific to our invention). Assuming the user selects "Y" preference values for any given routing selection factor, the lowest priority preference value is assigned a "preference factor cost" of "B", the next lowest priority preference value a cost of $((Y-1)/Y)B$, the next a cost of $((Y-2)/Y)B$, etc., and the highest priority preference value a cost of $((Y-(Y-1))/Y)B$. Because the "preference factor costs" for any given routing selection factor should sum to one, a value for "B" can be determined and correspondingly, a cost can be assigned to each preference value. This method was used to determine the "preference factor costs" for each routing selection factor in Table 2, as shown by Table 2, column 6.

Once the "routing selection factors," "preference values," "weighting factor for priority values," and "preference factor costs" are determined, method 100 proceeds to step 110 where the network routing system assigns a cost to each link in the network. As described above, the network routing system compares each link to the "X" selected "routing selection factors" and determines a "preference factor cost" for each factor depending on which "preference value" matches the characteristics of the link (step 110a). Following equation (1), each determined "preference factor cost" is then weighted by its corresponding "weighting factor for priority value" (step 110b) and the resulting weighted costs are summed (step 110c) to arrive at a final cost for the link. For example, if a given link has characteristics that match "Factor-1: Value-2," "Factor-3: Values-3," and "Factor4: Value-2" the link would have a cost of:

$$\sum_{n=1}^{3} w_n c_n = (0.333)(0.400) + (0.5)(0.666) + (0.166)(0.166) = 0.494$$

The network routing system performs this process for each link in the network (step 112). Note that if a selected "routing selection factor" does not apply to a given link, the network routing system assigns a large preference factor cost (e.g., a cost of 100 assuming the preference factor costs have a value between zero and one as described above) to that factor thereby giving that link a large resulting cost such that the network routing system disregards the link when determining a route. Similarly, when a "routing selection factor" does apply to a link but none of the selected preference values apply to the link, a large preference factor cost (e.g., a cost of 100) is again assigned to that factor giving that link a large resulting cost. Lastly, note that if a user selects a preference value of "any," as in "Factor4" of Table 2, the network routing system selects the preference factor cost assigned to this preference value if none of the other preference values apply to the link.

Once the network routing system assigns a cost to each of the network links, method 100 proceeds to step 114 where the network routing system uses a shortest path routing algorithm to determine all possible routes through the network and then chooses a least cost route from among these routes.

Figure 2:
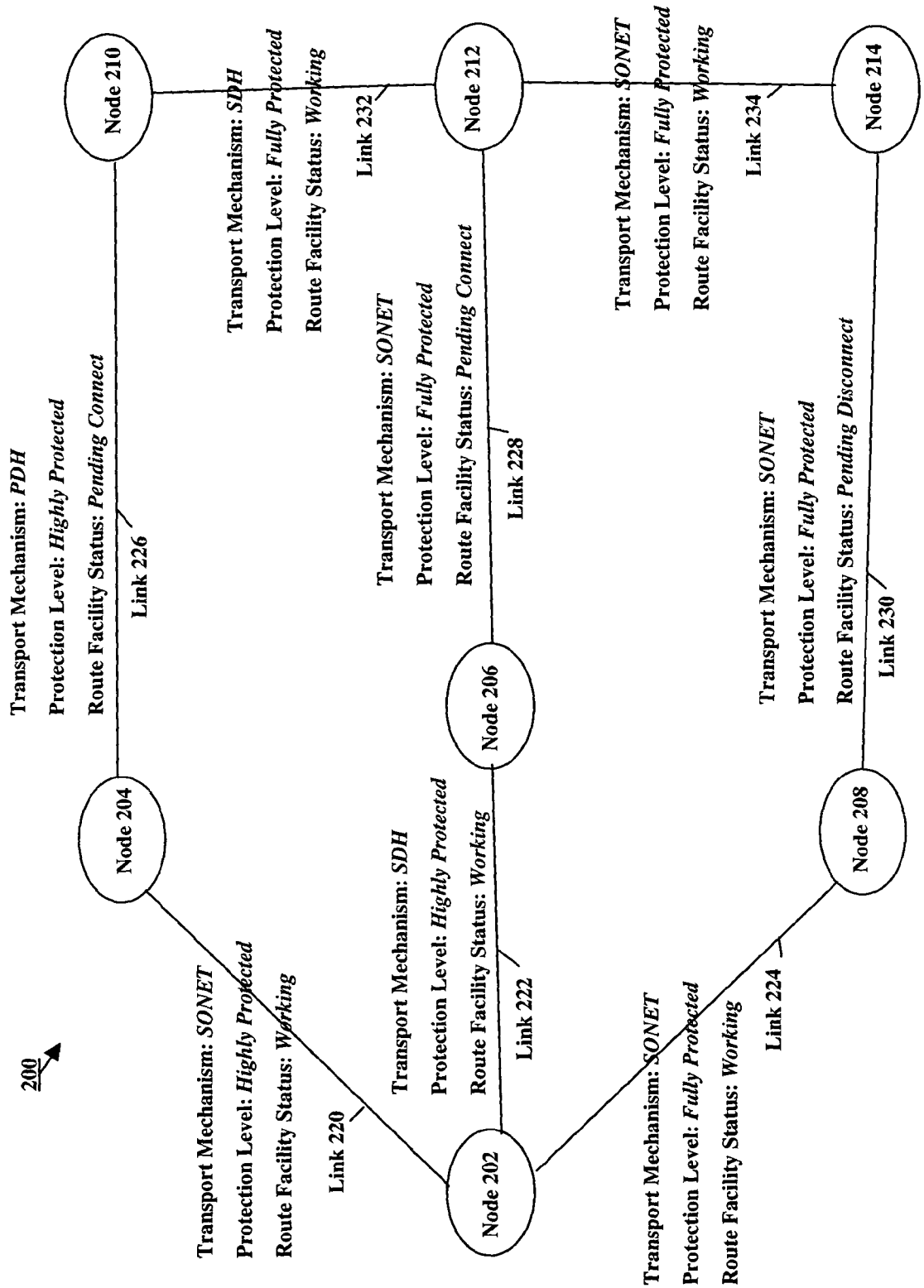
FIG. 2 is an exemplary network graph of nodes and links, each link having different characteristics and thereby different link-costs based on user-defined preferences in accordance with our invention.

For purposes of illustrating our inventive method for determining network routes, assume a user needs to determine a layer-one route through a network, with FIG. 2 showing an exemplary network graph 200 of this network and comprising nodes 202-214 interconnected by links 220-234. Assume the user has chosen "transport mechanism", "protection level", and "route facility status" from a set of predefined layer-one routing selection factors as the factors that should be considered when determining a cost for each link in the network (see Table 3, column 1). "Transport mechanism" and "protection level" were defined earlier. "Route facility status" is the status of the facilities to be used for route selection and has possible values, for example, including: pending connect, working, pending change, and pending disconnect. Assume further the user has chosen a set of preference values for each factor (Table 3, column 4), has prioritized the selected routing selection factors (Table 3, column 2), and has prioritized the selected preference values (Table 3, column 5). Using the method discussed above (i.e., $A+((X-1)/X)A+((X-2)/X)A+\ldots+((X-(X-1))/X)A=1$), a network routing system can assign a "weighting factor for priority value" to each selected routing selection factor (Table 3, column 3) and a "preference factor cost" to each selected preference value (Table 3, column 6).

TABLE 3

Example Set of Routing Selection Factors and Preference Values

| Selected "Routing Selection Factors" | Priority of Selected "Routing Selection Factors" | "Weighting Factor for Priority Values" | Selected "Preference Values" | Priority of Selected "Preference Values" | "Preference Factor Cost" |
|---|---|---|---|---|---|
| Transport Mechanism | 3 | 0.166 | SONET | 1 | 0.166 |
|  |  |  | SDH | 3 | 0.500 |
|  |  |  | PDH | 2 | 0.333 |
| Protection Level | 1 | 0.5 | fully protected | 1 | 0.333 |
|  |  |  | highly protected | 2 | 0.666 |
| Route Facility Status | 2 | 0.333 | pending connect | 2 | 0.666 |
|  |  |  | working | 1 | 0.333 |

Assuming links 220-234 of network graph 200 have the characteristics as shown in FIG. 2, the network routing system determines link costs for each link as shown in Table 4. Note that link 230 has a "routing facility status" of "pending disconnect," which is not one of the preference values specified in this example. Accordingly, the network routing system continues to assign a cost and determine a route along this link but assigns a large preference cost (e.g. 100) to this routing selection factor to ensure this link's cost is large (33.494). The large link cost ensures that when the network routing system ultimately chooses a final route, it places a low priority on any route traversing this link.

TABLE 4

Link Cost Calculations for Links of Network Graph in FIG. 2

| Link | Calculation of Link Costs | Cost |
|---|---|---|
| 220 | (0.166)(0.166) + (0.5)(0.666) + (0.333)(0.333) = | 0.471 |
| 222 | (0.166)(0.500) + (0.5)(0.666) + (0.333)(0.333) = | 0.527 |
| 224 | (0.166)(0.166) + (0.5)(0.333) + (0.333)(0.333) = | 0.305 |
| 226 | (0.166)(0.333) + (0.5)(0.666) + (0.333)(0.666) = | 0.610 |
| 228 | (0.166)(0.166) + (0.5)(0.333) + (0.333)(0.666) = | 0.416 |
| 230 | (0.166)(0.166) + (0.5)(0.333) + (0.333)(100) = | 33.494 |
| 232 | (0.166)(0.500) + (0.5)(0.333) + (0.333)(0.333) = | 0.360 |
| 234 | (0.166)(0.166) + (0.5)(0.333) + (0.333)(0.333) = | 0.305 |

Assuming the user needs to determine a route between node 202 and node 214 of network graph 200, Table 5 shows the costs for three routes between these nodes, which route costs were obtained by summing the individual link costs. Accordingly, the least cost route is from node 202 to node 206 to node 212 to node 214 (i.e., the route along links 222, 228, and 234).

TABLE 5

Route Costs for Routes Between Node 202 and Node 214 of FIG. 2

| Possible Routes From Node 202 to Node 214 | Route Cost |
|---|---|
| Node 202 => Node 204 => Node 210 => Node 212 => Node 214 | 1.746 |
| Node 202 => Node 206 => Node 212 => Node 214 | 1.248 |
| Node 202 => Node 208 => Node 214 | 33.799 |

In a second embodiment of our inventive method for determining a network route using dynamically defined link-costs based on user preferences, the method proceeds as shown in FIG. 1, steps 102-108; however, rather than the network routing system assigning a cost to each network link and then determining all possible routes, as in steps 110-114, these steps are combined. Specifically, once having the "weighting factor for priority values" and "preference factor costs," the network routing system determines a cost for each link as it determines a route between the start and end nodes as specified by the user. This method has the advantage that a link cost is not calculated for a given link unless the designated least cost routing algorithm considers the link in a possible route.

Figure 3:
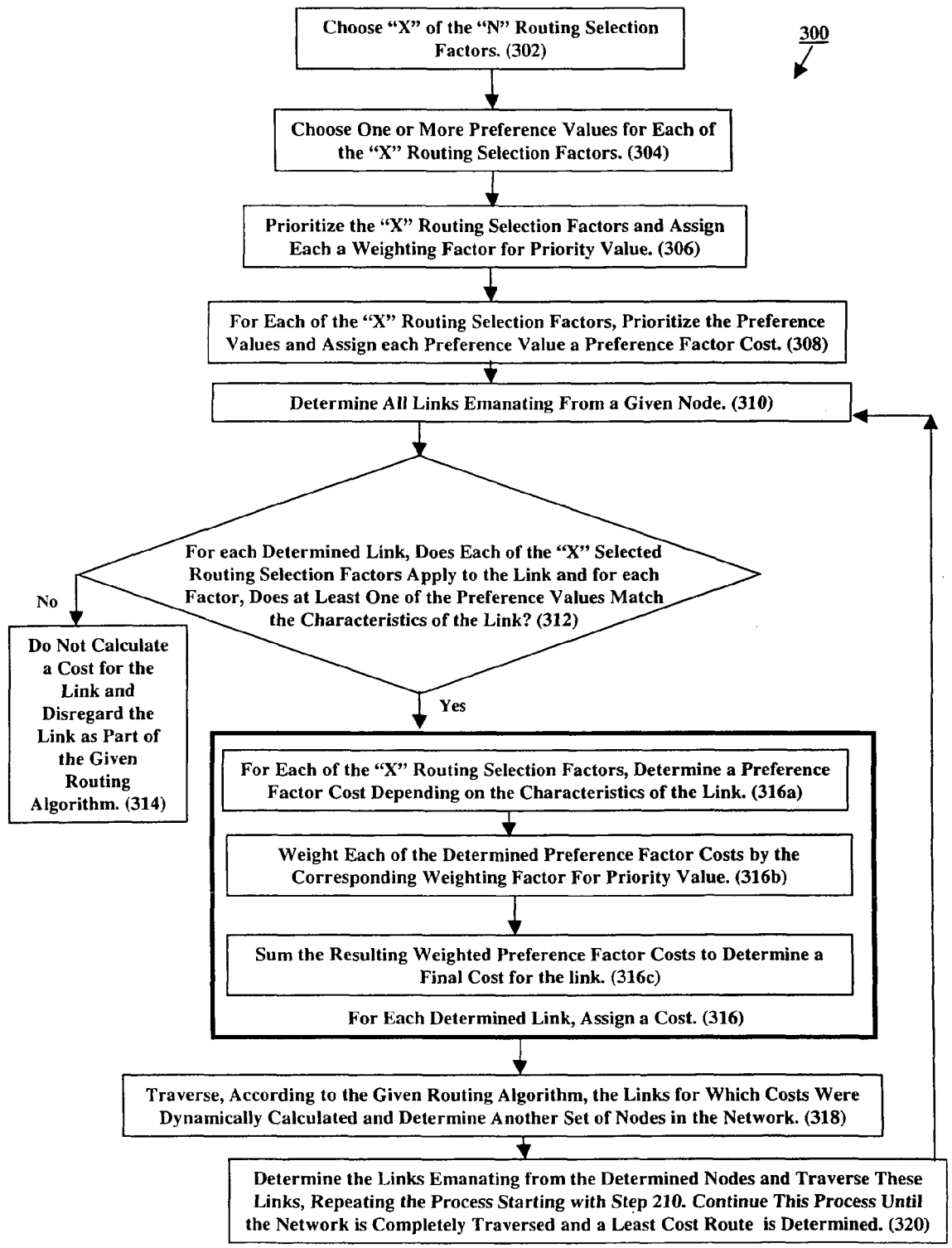
FIG. 3 depicts a flow chart for an illustrative second embodiment of our method for determining a route through a network using dynamically defined link-costs based on user-defined preferences.

FIG. 3 is a flow chart of the second embodiment of our inventive method 300, with steps 302-308 resembling steps 102-108, respectively. Moving to step 310, the network routing system determines, according to the least cost routing algorithm being used, all links emanating from a given node (e.g., at the start of the routing algorithm, all links emanating from the user specified starting node are determined). For each determined link, the network routing system in step 312 determines if each of the "X" selected "routing selection factors" applies to the link and further determines for each factor if at least one of the "preference values" matches the characteristics of the link. If at least one of the "X" selected "routing selection factors" does not apply to a link or if none of the "preference values" for a given factor apply to a link, no cost is calculated for that link and the link (and routes emanating from that link) is disregarded in the routing algorithm (step 314). (For example, in network 200, the routing system would disregard link 230 (and routes including this link) because "pending disconnect" is not a preference value specified by the user.) However, for each link that meets both criteria, the network routing system determines a cost for the link (step 316). Specifically, the network routing system determines a "preference factor cost" for each of the "routing selection factors" depending on which "preference values" match the characteristics of the link (step 316a), weights each determined "preference factor cost" by its corresponding "weighting factor for priority value" (step 316b), and sums the resulting weighted costs to arrive at a final link cost (step 316c) as described earlier. In step 318 the network routing system traverses, according to the given routing algorithm, those links for which costs were dynamically calculated in step 316 and determines another set of nodes in the network. In step 320, the network routing system determines the links emanating from these additional nodes (again, according to the given routing algorithm) and traverses these links, repeating the process beginning with step 310. The network routing system continues this process until the entire network is traversed and a set of routes are determined. It then selects a least cost from among these routes.

The above-described embodiments of our invention are intended to be illustrative only. Numerous other embodiments may be devised by those skilled in the art without departing from the spirit and scope of our invention.

We claim:

1. A method for determining a route through a network, the method comprising:
    identifying a plurality of routes, wherein each route comprises a plurality of links;
    calculating a route cost for each route by summing a link cost calculated for each link of the plurality of links; and
    selecting a route based on the calculated route costs;
        wherein the link cost for each link is calculated by determining a weighting value for a routing factor of a plurality of routing factors;
    determining a cost value by matching an allowable value of the routing factor to a characteristic of the link;
    determining a weighted cost value by combining the determined weighting value with the determined cost value;
    repeating the determining operations for each of the plurality of routing factors; and
    summing the determined weighted cost value for each of the plurality of routing factors to determine the link cost;
    selecting the plurality of routing factors from a set of routing factors;
    for each selected routing factor, selecting one or more allowable values;
    assigning a weight to each selected routing factor; and
    for each selected routing factor, assigning each selected allowable value a cost.

2. The method of claim 1 further comprising:
    prioritizing the plurality of routing factors; and
    for each routing factor, prioritizing the allowable values.

3. The method of claim 2 further comprising:
    determining a weight for each routing factor automatically based on the prioritization of the routing factor; and
    for each routing factor, determining a cost for each of the allowable values automatically based on the prioritization of the values.

4. The method of claim 1 further comprising determining if the routing factor applies to the link and if the routing factor does not apply, assigning a large cost value to the weighting value.

5. The method of claim 1 further comprising determining if an allowable value matches the characteristic of the link; and if no allowable value matches the characteristic of the link, using a large cost value for the cost value.

6. The method of claim 1 wherein the weights assigned to the selected routing factors are based on a prioritization of the factors.

7. The method of claim 1 wherein the costs assigned to the selected allowable values for each selected routing factor are based on a prioritization of the allowable values.

8. The method of claim 1 wherein the selected one or more allowable values includes a default value, and wherein the default value matches the characteristic of the link if no other allowable value matches the characteristic of the link.

9. The method of claim 1 wherein the link costs are calculated before identifying the plurality of routes.

10. The method of claim 1 wherein the link costs are calculated as the plurality of routes are identified.

11. The method of claim 10 further comprising determining if all of the plurality of routing factors apply to the link; and if not, disregarding the link.

12. The method of claim 10 further comprising determining if the routing factor applies to the link; and if not, disregarding the link.

13. The method of claim 12 further comprising determining if an allowable value for the routing factor matches a characteristic of the link; and if not, disregarding the link.

14. The method of claim 1 further comprising determining if an allowable value for the routing factor matches a characteristic of the link; if not, determining if an allowable value has a default value; and if an allowable value has a default value, determining the cost value based on the default value.

15. The method of claim 1 wherein the plurality of routes are identified before the link costs are calculated.

16. The method of claim 1 wherein combining the determined weighting value with the determined cost value comprises multiplying the determined weighting value and the determined cost value.

* * * * *